(12) United States Patent
Caldwell

(10) Patent No.: US 7,942,193 B2
(45) Date of Patent: May 17, 2011

(54) HEAT RECOVERY VENTILATOR WITH DEFROST

(75) Inventor: Bradley D. Caldwell, Hantsport (CA)

(73) Assignee: Nu-Air Ventilation Systems Inc., Windsor, Nova Scotia (CA)

( * ) Notice: Subject to any disclaimer, the term of this patent is extended or adjusted under 35 U.S.C. 154(b) by 404 days.

(21) Appl. No.: 12/274,859

(22) Filed: Nov. 20, 2008

(65) Prior Publication Data

US 2009/0133851 A1 May 28, 2009

Related U.S. Application Data

(60) Provisional application No. 60/996,522, filed on Nov. 21, 2007.

(51) Int. Cl.
*A23C 3/02* (2006.01)
*F24H 3/02* (2006.01)
*F24F 7/00* (2006.01)

(52) U.S. Cl. .............................. 165/66; 165/54; 165/59

(58) Field of Classification Search ............... 165/54, 165/52, 59, 66, 97, 248; 236/49.3
See application file for complete search history.

(56) References Cited

U.S. PATENT DOCUMENTS

| 4,653,574 A | 3/1987 | Quinlisk et al. ................ 165/54 |
| 5,257,736 A | 11/1993 | Roy ............................. 236/49.3 |
| 5,855,320 A | 1/1999 | Grinbergs ....................... 237/46 |
| 6,169,849 B1 | 1/2001 | Schmidt ........................ 392/344 |
| 7,073,566 B2 | 7/2006 | Lagace et al. ..................... 165/8 |
| 2005/0000681 A1 | 1/2005 | Gagnon et al. .................. 165/66 |
| 2007/0084586 A1 | 4/2007 | Poirier ........................... 165/97 |

OTHER PUBLICATIONS

International Search Report, PCT/CA2008/002035, Feb. 19, 2009.

*Primary Examiner* — Chen-Wen Jiang
(74) *Attorney, Agent, or Firm* — Teitelbaum & MacLean; Neil Teitelbaum; Doug MacLean

(57) ABSTRACT

A defrost system for a heat recovery ventilator/energy recovery ventilator (HRV/ERV), uses the interior space supply air of an integrated fan coil for defrosting a HRV/ERV core without creating negative pressure in the interior space, which wastes energy, without need of an external fifth port from which to draw defrost air from the interior space, which increases costs, and without re-circulating exhaust air into the interior space. During the defrost cycle, automatically controlled dampers close off the fresh air and exhaust air inputs, and exhaust output, and circulate supply air through the heat exchange core and into to the living space.

13 Claims, 6 Drawing Sheets

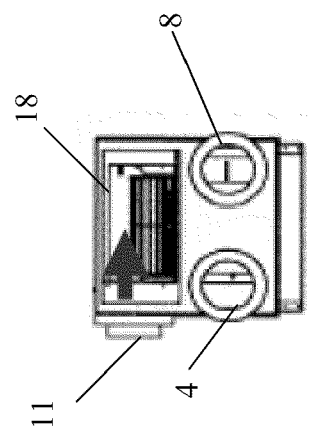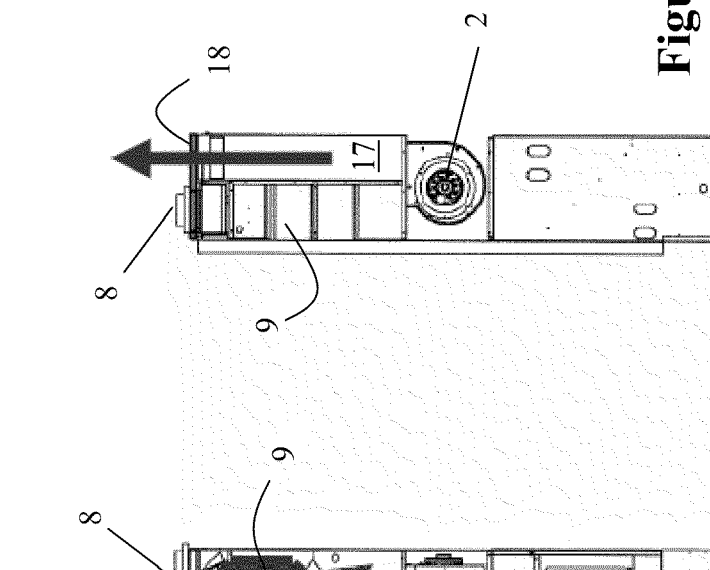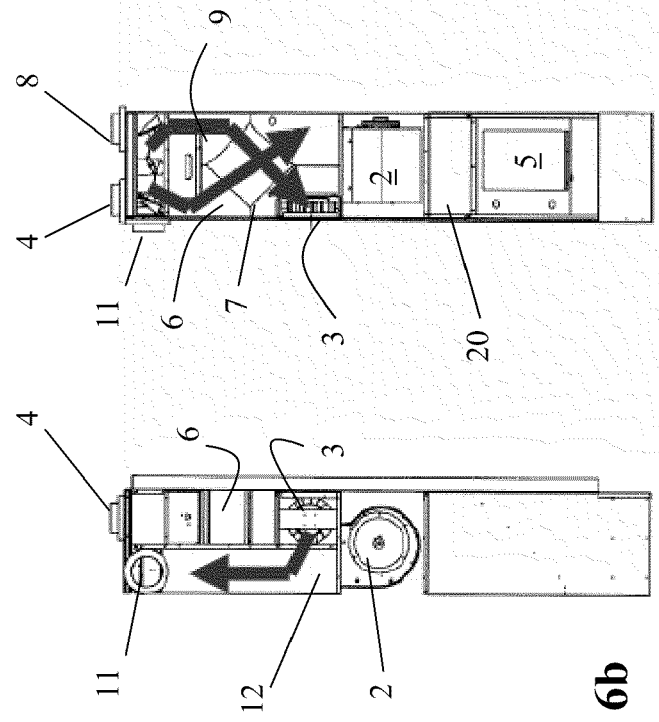
Figure 6a   Figure 6b   Figure 6c   Figure 6d

HEAT RECOVERY VENTILATOR WITH DEFROST

CROSS-REFERENCE TO RELATED APPLICATIONS

The present invention claims priority from U.S. Patent Application No. 60/996,522 filed Nov. 21, 2007, by Caldwell, entitled "INTEGRATED FAN COIL SUPPLY AIR DEFROST METHOD", which is incorporated herein by reference for all purposes.

TECHNICAL FIELD

The present invention relates to a defrost system for a heat recovery ventilator/energy recovery ventilator (HRV/ERV), and in particular to a defrost system that utilizes interior space supply air to defrost the core in the integrated fan coil of the HRV/ERV.

BACKGROUND OF THE INVENTION

An integrated fan coil refers to an air handling system which combines in one appliance the typical functions of a hydronic or direct exchange air handler and the typical functions of an HRV/ERV device. A typical direct exchange air handler includes a forced air furnace circulating heated or air conditioned air to an interior space via a duct or direct grille return system. A typical HRV or ERV device brings fresh air into an interior space from outdoors via a duct system with a heat exchange core, and expels exhaust and stale air from that same interior space via the heat exchange core, which transfers sensible and latent energy from the exhaust air to the fresh air. Typically, the HRV/ERV core, helps control the relative humidity of the interior space, and recovers energy from the exhaust air stream.

Conventional HRV devices, such as those disclosed in U.S. Pat. No. 4,653,574 issued Mar. 31, 1987 to L.B. White Company, Inc; U.S. Pat. No. 5,257,736 issued Nov. 2, 1993 to Donald Roy; U.S. Pat. No. 5,855,320 issued Jan. 5, 1999 in the name of Nutech Energy Systems Inc.; and U.S. Pat. No. 6,169,849 issued Jan. 2, 2001 to Olsberg Hermann Everken GmbH, provide a heat exchanging core to enable the transfer of heat from exhaust air to intake air. Unfortunately, prior art HRV systems do not, without drawbacks, solve the problem of heat exchange cores becoming too cold and frosting over.

A simple conventional defrosting system is to shut down the fresh air input fan and exhaust interior air through the heat exchange core. Unfortunately, fan shut-down defrost systems cause negative pressurization of the interior space, as they exhaust air through the HRV/ERV core to thaw the core out, without introducing fresh air into the interior space because the fresh air fan is "shut down" during defrost cycles. Moreover, during defrost cycles, fan shut-down HRV/ERV systems expel heat from the interior space without passing any of that heat on to incoming fresh air, since fresh air is not coming into the building when the fresh air fan is shut off, resulting in heat energy loss. Another short-coming of fan shut-down defrost systems is that they take longer to defrost the HRV/ERV core than other defrost systems because fan shut-down systems provide warm air to only one side of the core.

There is no negative pressurization of the interior space and its associated heat energy loss, no need to locate or run special ductwork, nor any special consideration needed for unit location (in terms of defrost performance), all typical disadvantages of "$5^{th}$ port" defrost systems.

Conventional 5th port defrost systems address the issue of feeding defrost air to both sides of the HRV/ERV core, thereby performing their function faster than fan shut-down defrost systems; however, they still create negative pressurization of the interior space resulting in energy losses. Another disadvantage of $5^{th}$ port defrost systems is that they require an extra duct, which is used for defrost purposes, to be run between the unit and the interior space. As the space in building design for mechanical ventilation systems is usually minimal, adding a $5^{th}$ port can present major space and aesthetic issues, not to mention added costs of running the duct for the $5^{th}$ port. Alternatively, the HRV/ERV could be located in a room to draw defrost air into the unit directly. While this method of installation eliminates the need for special ductwork, care must be given in unit location: the room in which the unit is located must be heated and this room must not contain any source of noxious odours or airborne chemicals.

Re-circulation defrost systems address the efficiency, space, aesthetic and cost shortcomings of fan shut-down and $5^{th}$ port defrost systems; however, recirculation defrost systems re-circulate stale and exhaust air through the HRV/ERV core, thus delivering, stale and perhaps smelly air to the interior space during defrost cycles, adversely affecting the level of comfort experienced by occupants of the interior space.

An object of the present invention is to overcome the shortcomings of the prior art by providing a HRV or ERV defrosting unit, which doesn't require negative depressurization of the interior space, an external $5^{th}$ port, or re-circulation of exhaust air into the interior space.

SUMMARY OF THE INVENTION

Accordingly, the present invention relates to an energy recovery ventilator (HRV) located within an interior space including a first set of rooms and a second set of rooms comprising:

a fresh air inlet port for inputting fresh air from outside the interior space;

an exhaust air inlet port for inputting exhaust air from the first set of rooms;

a heat exchange core for transferring heat from the exhaust air to the fresh air;

an exhaust air outlet port for outputting the exhaust air outside the interior space;

a return air input port for inputting return air from the second set of rooms;

a first fan for drawing the return air in to form supply air, for drawing the fresh air in forming a mixture of the fresh air and the supply air, and for blowing the mixture of the fresh air and the supply air into the interior space;

a supply air outlet port for outputting the mixture of fresh air and supply air to the interior space;

a second fan for drawing in the exhaust air through the ERV core, and for blowing the exhaust air out the exhaust air outlet port;

a first damper having a first open position enabling the fresh air to pass through the fresh air inlet port, and a second position preventing fresh air from passing through the fresh air inlet port;

a second damper having a first open position enabling exhaust air to pass through the exhaust air inlet port, and a second position preventing exhaust air from passing through the exhaust air inlet port;

a third damper having a first open position enabling exhaust air to pass through the exhaust air outlet port, and a second position preventing exhaust air from passing through the exhaust air outlet port;

a damper control for controlling the position of the first, second and third dampers, whereby when the first, second and third dampers are positioned in the closed positions, supply air, after passing through the first fan, is redirected by the first and second dampers through the ERV core, and by the third damper to the interior space.

BRIEF DESCRIPTION OF THE DRAWINGS

The invention will be described in greater detail with reference to the accompanying drawings which represent preferred embodiments thereof, wherein:

FIGS. 6a to 6d illustrate the flow of air through the integrated fan coil of FIG. 1 during defrosting operation.

DETAILED DESCRIPTION

Figure 1:
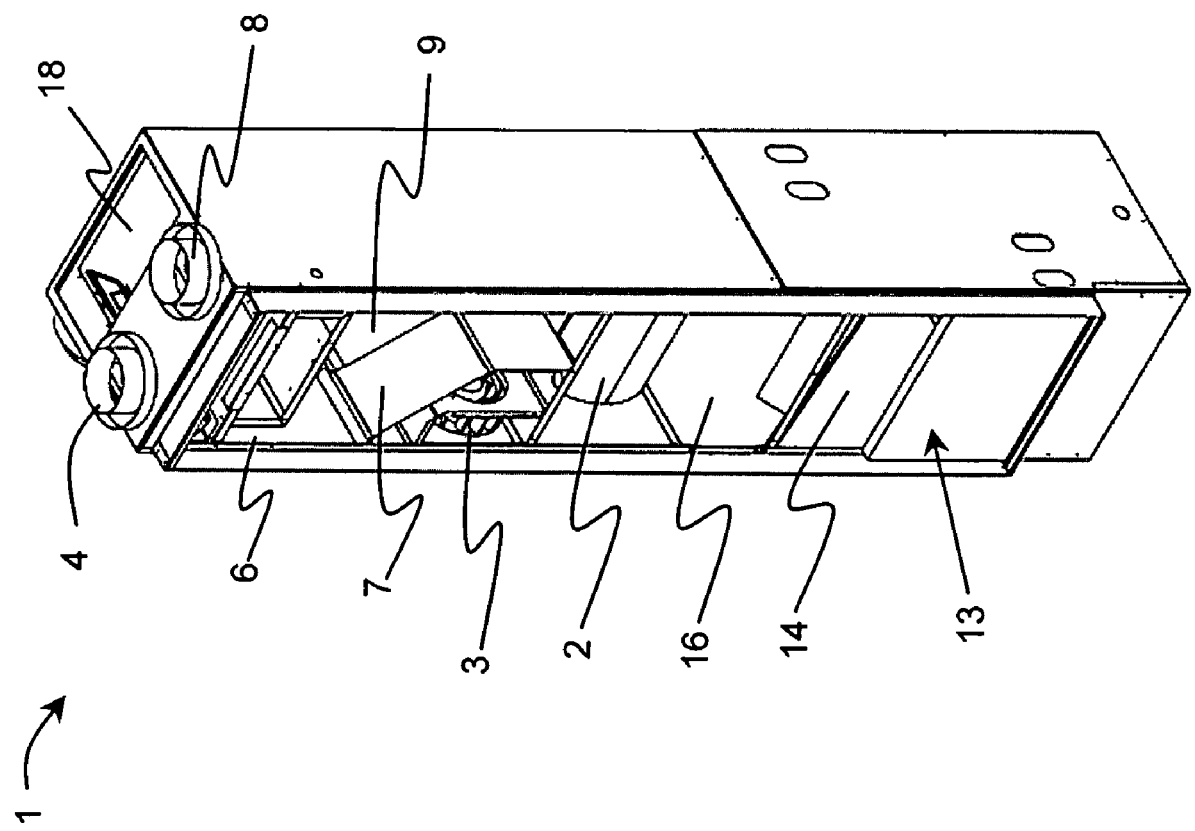
FIG. 1 is an isometric view of the integrated fan coil of the present invention
Figure 2:
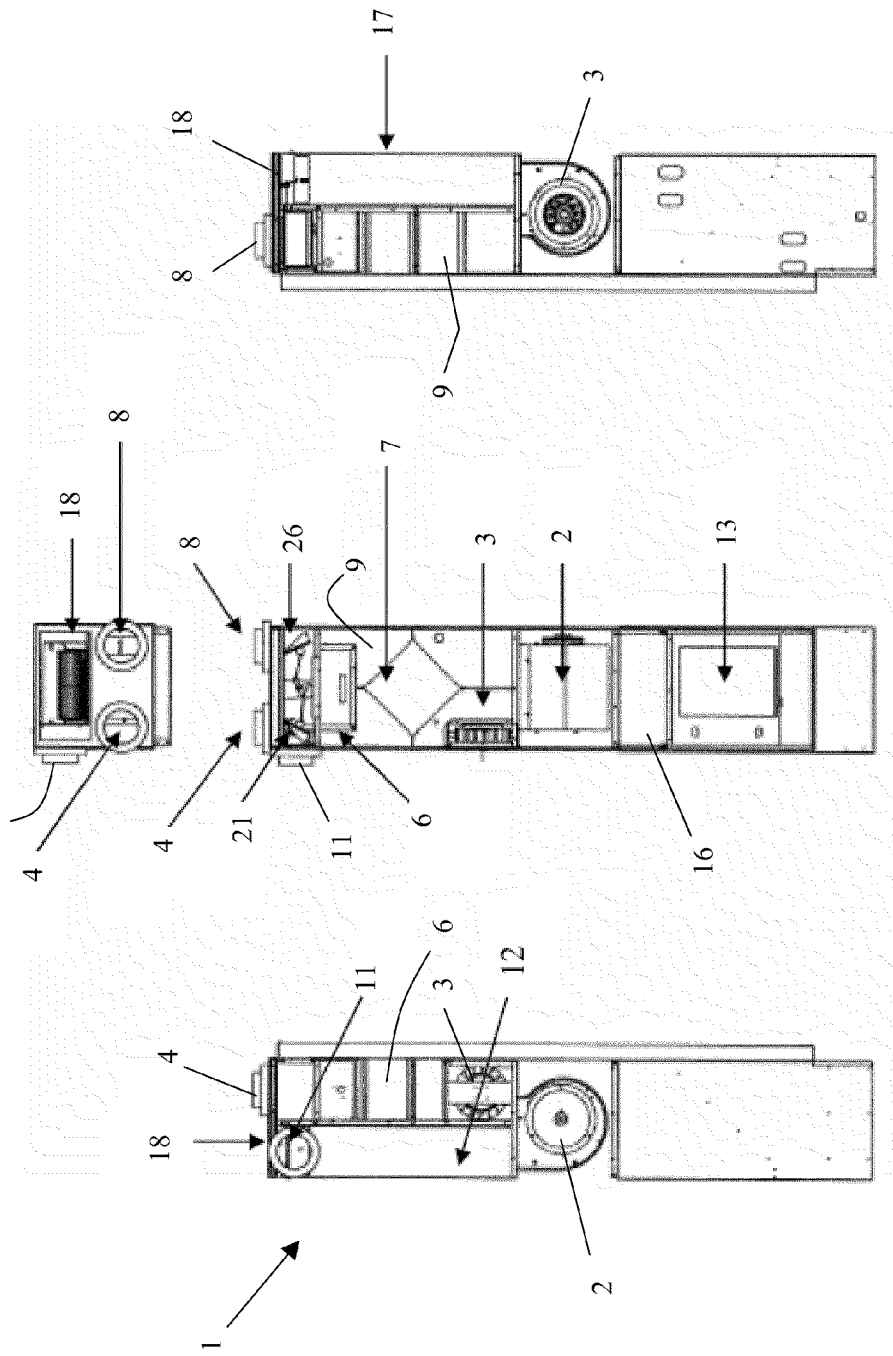
FIG. 2a is a side view of an integrated fan coil of FIG. 1.
FIG. 2b is a front view of the integrated fan coil of FIG. 1.
FIG. 2c is a side view of the integrated fan coil of FIG. 1.
FIG. 2d is a top view of the integrated fan coil of FIG. 1.
Figure 3:
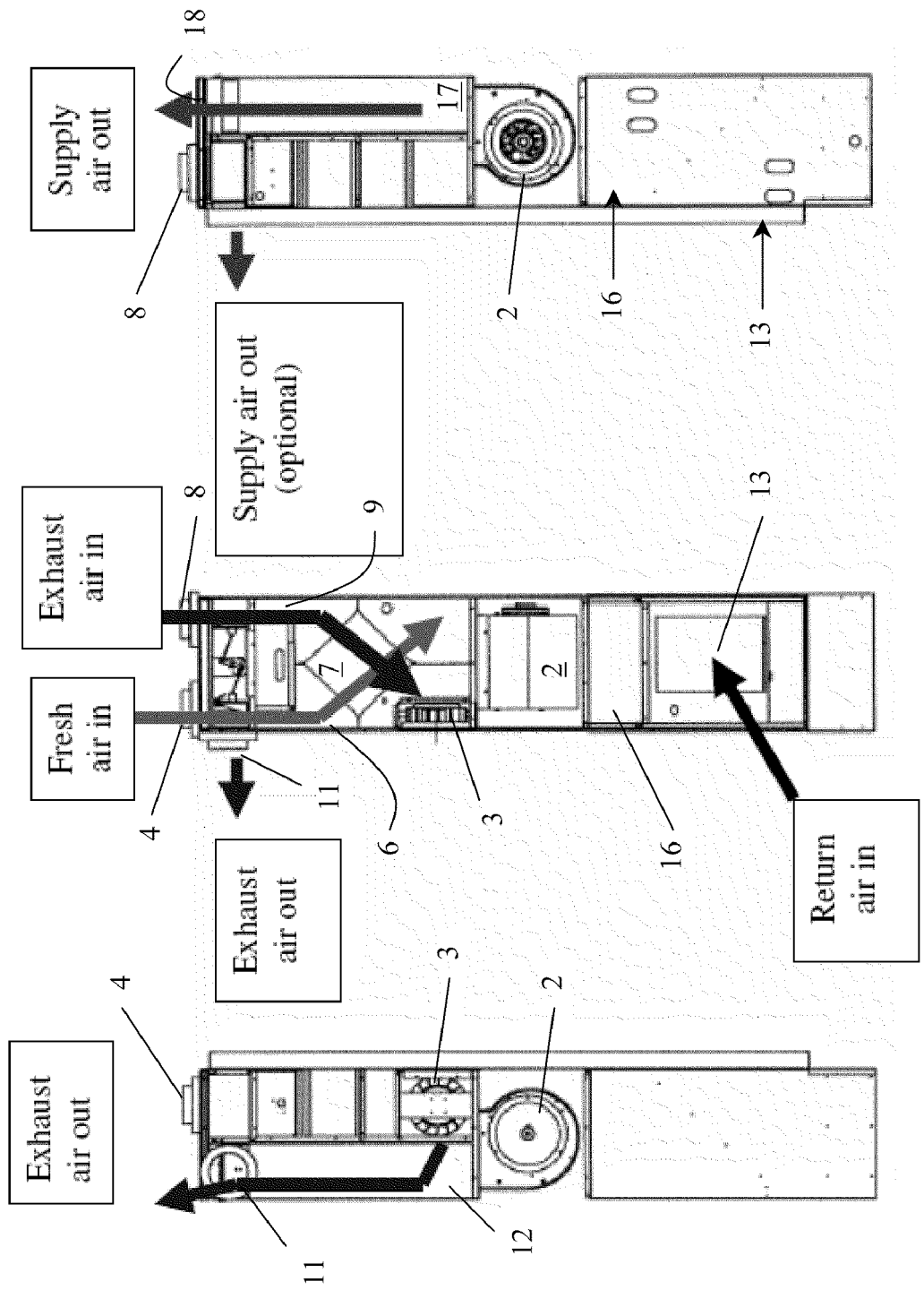
FIGS. 3a to 3c illustrates the flow of air through the integrated fan coil of FIG. 1 during normal operation.

With reference to FIGS. 1 to 3c, the integrated fan coil of the present invention includes a generally rectangular housing 1 resting on one end, with a main fan 2 and a secondary fan 3 disposed proximate the middle thereof. During normal operation, the main fan 2 draws in fresh air from the outside, draws in return air only from a first group of selected rooms on the inside of the structure, and delivers supply air to all of the rooms on the inside of the structure. A secondary fan 3 is provided for drawing in exhaust air only from a second group of selected interior rooms for preheating the fresh outside air, as explained hereinafter, and delivering the exhaust air to the outside of the structure. Although this description refers to specific locations of air ports, it should be noted that the location of these ports may vary as building design dictates.

During normal operation, fresh outside air is drawn in by the main fan 2 through the fresh air intake port 4, at an upper end of the housing 1, down along a fresh air intake passage 6 in the front left portion of the housing 1 to one side of an ERV core 7, e.g. a heat exchanger, as in FIG. 3b. Simultaneously, stale, humid exhaust air from the second group of selected interior rooms, e.g. bathrooms, kitchens, laundry and exercise rooms, different than the first group or rooms, is drawn in by the exhaust fan 3 through an exhaust air intake port 8, at the upper end of the housing 1, down along an exhaust air intake passage 9 in the front right side of the housing 1 to another side of the ERV core 7 for exchanging energy with the fresh intake air, e.g. preheating during winter or precooling during summer. After passing through the ERV core 7, the exhaust air is delivered back up to an exhaust output port 11, extending out of the side of the housing 1 near the upper end of thereof, via an exhaust air output passage 12 in the back left side of the housing 1, which is adjacent to the fresh air intake passage 6 to further provide energy exchange between the exhaust air and the incoming fresh air, as in FIG. 3a.

Return air, drawn in by the main fan 2 from the first group of selected interior rooms, e.g. less humid rooms such as bedrooms, living rooms, family rooms, and offices, enters the housing 1 via the return air port 13, and then passes through an air filter 14 and a heat treatment, e.g. heating and/or cooling, device 16, one or both of which can be within the housing 1 or in a separate housing to become supply air as positive pressure is applied. The illustrated fan coil includes water coils for heating and/or cooling, but any combination of heating devices and cooling devices, including standard natural gas or oil burners and air conditioners, is within the scope of the invention. The heat treatment device 16 can be set to a circulation mode, in which no heat is transferred, but air is simply circulated throughout the building. The heated or cooled (treated) supply air is mixed by the main fan 2 with incoming fresh air pretreated in the ERV core 7, which is then delivered to the interior rooms of the building, e.g. both the first and second groups of interior rooms, via the supply air passage 17 and supply air outlet port 18, at the upper end of the housing 1, adjacent the fresh and exhaust air intake ports 4 and 8, respectively, as in FIG. 3c. Suitable duct work is connected to the supply air outlet port 18 for delivering the supply air to the various rooms throughout the building.

Figure 4:
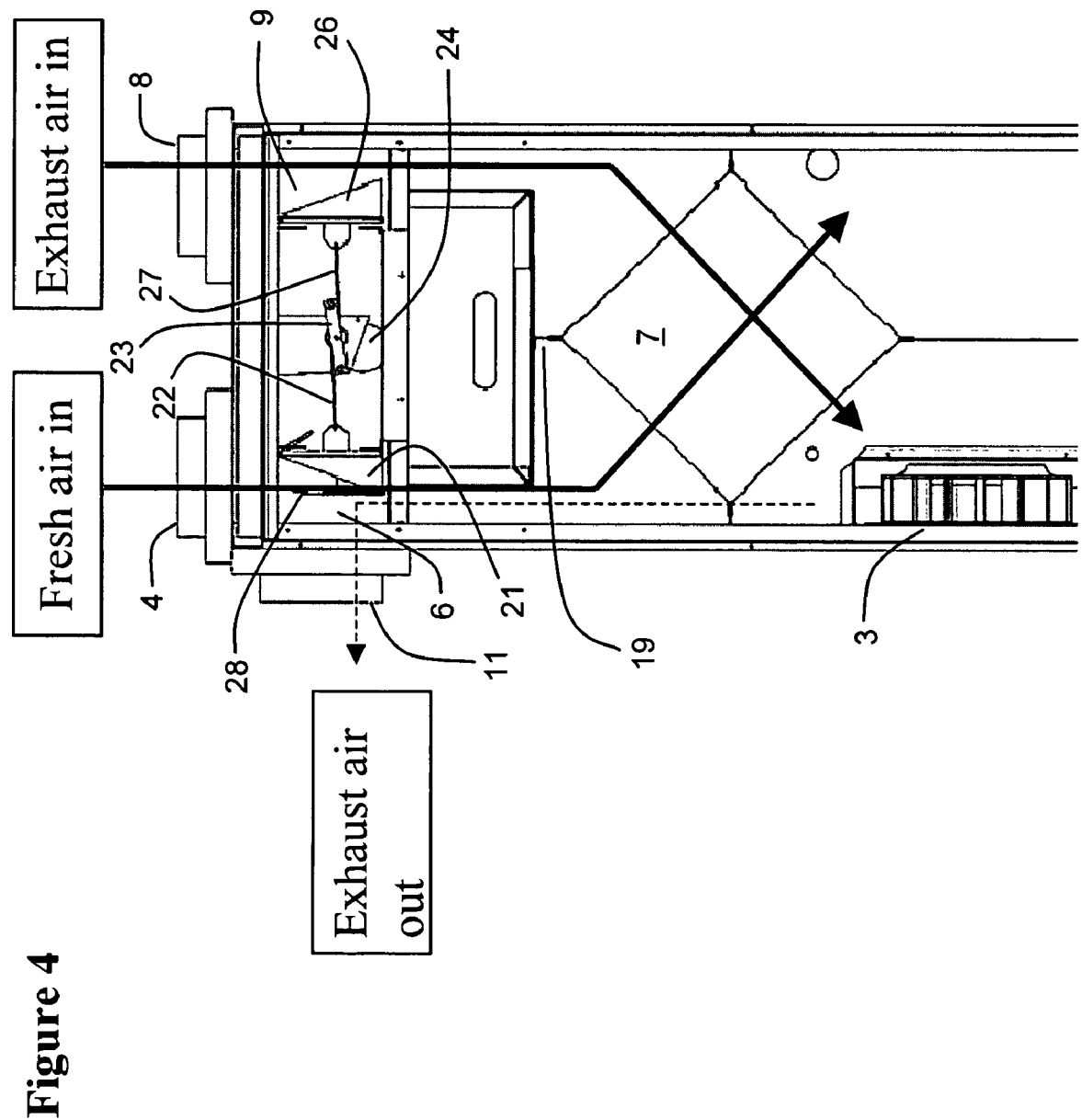
FIG. 4 is a front view of the upper section of the integrated fan coil of FIG. 1 with the dampers in the closed (normal) position.
Figure 5:
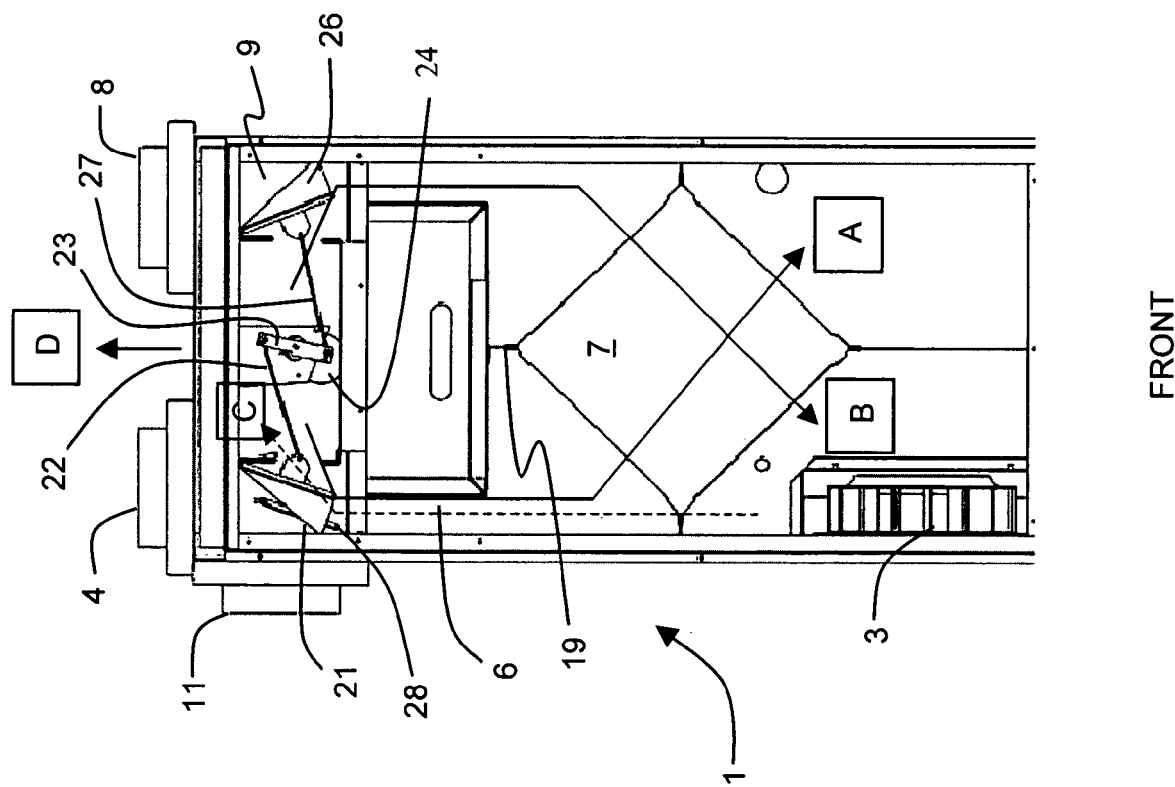
FIG. 5 is a front view of the upper section of the integrated fan coil of FIG. 1 with the dampers in the open (defrost) position.

With reference to FIG. 4, a first damper 21 is pivotally mounted within the fresh air intake passage 6 enabling fresh air to pass therethrough when in a first position during normal operation, while preventing fresh air from entering the fresh air intake passage 6 when in a second position during defrosting operation. A link 22 connects the first damper 21 to a rod 23, which is rotated by a motor 24, for pivoting the first damper between the first and second positions.

A second damper 26 is pivotally mounted within the exhaust air intake passage 9 enabling the exhaust air to pass therethrough when in a first position during normal operation, while preventing exhaust air from entering the exhaust air intake passage 9 when in a second position during defrosting operation. A link 27 connects the second damper 26 to the rod 23, which is rotated by the motor 24 for pivoting the second damper between the first and second positions, along with the first damper 21. A third damper 28 is pivotally mounted within the exhaust air output passage 12 enabling the exhaust air to pass through the exhaust air output port 11 during normal operation, while diverting air from the exhaust air output port 11 to the supply air output passage 17 during the defrosting operation. The third damper 28 can be connected to the first damper 21, so that rotation of the first damper 21 results in rotation of the third damper 28.

A control center, typically mounted in or on the housing 1, but possibly mounted remote from the integrated fan coil, includes a micro-controller, with some form of memory, electronically connected to the main fan 2, the secondary fan 3, the heating/cooling device 16, a temperature sensor 19, and the damper motor 24 for control thereof. The temperature sensor 19 is positioned within the housing 1 proximate the ERV core 7 to provide an accurate measure of the temperature in the ERV core 7 During normal operation, the control center takes input from a thermostat and/or dehumidistat placed strategically within the building, and cycles the heating/cooling device 16 along with the main and secondary fans 2 and 3, respectively, between active and inactive to ensure the temperature and/or relative humidity of the building remains at the predetermined temperature set by the occupants of the building. Alternatively, the integrated fan coil can be run in a simple ventilation mode with the main and secondary fans 2 and 3, respectively, running, but without any temperature adjustment by the heating/cooling device 16.

When the temperature sensor 19 detects the temperature in the incoming fresh air before, after or during preheating, but preferably before, to be below a predetermined threshold value, e.g. −5° C. to +5° C., but preferably 0° C., the control center switches the integrated fan coil to the defrost mode by first switching on the motor 24 and rotating the first, second and third dampers 21, 26 and 28 to their second (closed) positions. Accordingly, fresh air is prevented from entering the ERV core 7 and from being delivered to the interior rooms of the building. Moreover, stale exhaust air is also prevented from entering into the ERV core 7, and from being exhausted to the outside via exhaust output port 11. Furthermore, as illustrated in FIGS. 5 and 6a to 6d, a portion of the supply air, made up of return air only, is diverted by the first damper 21 from the supply air passage 17 back through the fresh air intake passage 6, and through one side of the ERV core 7 to the main fan 2, see A in FIG. 5. Simultaneously, another portion of the supply air is diverted by the second damper 26 from the supply air passage 17 back through the exhaust air intake passage 9, and through the other side of the ERV core 7 to the secondary fan 3, see B in FIG. 5. The warm, dry supply air, diverted from the supply air passage 17, defrosts the ERV core 7 from both sides to ensure even warmth and efficient heat transfer. The main fan 2, recirculates the defrost air from the air intake passage 9 back up the supply air passage 17 for output to the building via supply air output port 18 or diversion back through the ERV core 7 again, see D in FIG. 5. The secondary fan 3 recirculates the defrost air back up through the exhaust air output passage 12 to the third damper 28, which diverts the defrost air into the supply air passage 17 and out the supply air output port 18 to the rooms in the building, see C in FIG. 5.

The supply air is pushed (positive pressure) into the supply air passage 17 by the main fan 2. After passing through the ERV core 7, the main fan 2 draws (negative pressure) the air back into the main fan 2. Some of the air finds its way back into the defrost circuit and some of it passes out of the fan coil through the supply air passage 17.

The supply air is pushed by the main fan 2 through the exhaust side of the HRV core 7. After passing through the core 7 the secondary fan 3 takes over and draws that air up the exhaust air outlet passage 12 and pushes it into the supply air passage 17, some of which will enter the building space, some of which will follow the defrost circuit again.

During the defrost mode, both the main and secondary fans 2 and 3 are run at a lower speed than during normal operation, unless other parameters dictate otherwise. The defrost mode continues for a predetermined time period, e.g. 1 to 5 minutes, then the integrated fan coil returns to normal operation for another predetermined time period (e.g. 30 minutes) If during the second time period the temperature sensor 19 detects a temperature below the threshold temperature, the defrost cycle is repeated. If the temperature of the incoming fresh air remains above the threshold temperature, then the integrated fan coil continues in normal operation.

The ERV core defrosting system of the present invention is practical for integrated fan coils used in multi-unit housing or lodging, e.g. apartments, hotels and condominiums, and small single-family homes. The integrated fan coils can be the indoor component of known direct exchange (Dx) split systems or the en suite component of known two- or four-pipe hydronic air treatment systems, which use a central heating and/or cooling plant.

The present invention prevents the ERV/HRV core 7 of the integrated fan coil from freezing during cold weather operation. Advantageously, the present invention maintains neutral pressurization of the interior space during the defrost operation by blocking both the fresh air intake port 3 and the exhaust air output port 11 in the defrost mode. Blocking the exhaust air output port 11 also saves energy by eliminating the need to exhaust air from the interior space for the purpose of defrosting the HRV/ERV core. Another feature of the present invention is that particularly stale, e.g. humid or odorous, interior air is not used for the purposes of the HRV/ERV defrost by having separate intake ports for different sets of rooms, i.e. one set with particularly stale air and one set with normal air. To defrost mode is shortened as much as possible by delivering warm interior space air to both sides of the HRV/ERV core 7 at the same time.

I claim:

1. An energy recovery ventilator (HRV) located within an interior space including a first set of rooms and a second set of rooms comprising:

a fresh air inlet port for inputting fresh air from outside the interior space;

an exhaust air inlet port for inputting exhaust air from the first set of rooms;

a heat exchange core for transferring heat from the exhaust air to the fresh air;

an exhaust air outlet port for outputting the exhaust air outside the interior space;

a return air input port for inputting return air from the second set of rooms;

a first fan for drawing the return air in to form supply air, for drawing the fresh air in forming a mixture of the fresh air and the supply air, and for blowing the mixture of the fresh air and the supply air into the interior space;

a supply air outlet port for outputting the mixture of fresh air and supply air to the interior space;

a second fan for drawing in the exhaust air through the ERV core, and for blowing the exhaust air out the exhaust air outlet port;

a first damper having a first open position enabling the fresh air to pass through the fresh air inlet port, and a second position preventing fresh air from passing through the fresh air inlet port;

a second damper having a first open position enabling exhaust air to pass through the exhaust air inlet port, and a second position preventing exhaust air from passing through the exhaust air inlet port;

a third damper having a first open position enabling exhaust air to pass through the exhaust air outlet port, and a second position preventing exhaust air from passing through the exhaust air outlet port;

a damper control for controlling the position of the first, second and third dampers, whereby when the first, second and third dampers are positioned in the closed positions, supply air, after passing through the first fan, is redirected by the first and second dampers through the ERV core, and by the third damper to the interior space.

2. The ERV according to claim 1, further comprising:

a fresh air inlet passage connecting the fresh air input port with one side the ERV core;

an exhaust air inlet passage connecting the exhaust air inlet port with another side of the ERV core;

an exhaust air outlet passage connecting the other side of the ERV core to the exhaust air outlet port;

a supply air outlet passage connecting the first fan to the supply air outlet port;

wherein in the closed position the first damper enables supply air from the supply air outlet passage into the fresh air inlet passage;

wherein in the closed position the second damper enables supply air from the supply air outlet passage into the exhaust air inlet passage; and wherein in the closed position the third damper enables the supply air from the exhaust air outlet passage back into the supply air outlet passage.

3. The ERV according to claim 2, wherein the exhaust air outlet passage is adjacent the fresh air inlet passage to enable heat transfer between incoming fresh air and outgoing exhaust air.

4. The ERV according to claim 1, further comprising a temperature control for sensing the temperature of fresh air, and for setting the first, second and third dampers in the closed positions when the temperature of the fresh air is below a predetermined threshold.

5. The ERV according to claim 4, wherein the temperature control sets the first, second and third dampers in the closed positions for a predetermined period of time when the temperature of the fresh air is below the predetermined threshold, and then sets them in the open position again.

6. The ERV according to claim 1, further comprising a return air treatment device for heating or cooling the return air prior to mixing with the fresh air.

7. The ERV according to claim 6, wherein the return air treatment device comprises a furnace or an air conditioner.

8. The ERV according to claim 6, wherein the return air treatment device comprises a hydronic air treatment for heating and cooling.

9. The ERV according to claim 1, wherein the first set of rooms are selected from the group consisting of bathrooms and kitchens.

10. The ERV according to claim 9, wherein the second set of rooms are selected from the group consisting of bedrooms, family rooms, offices and living rooms.

11. A heating, ventilating and cooling system for a building comprising:
    the ERV according to claim 1;
    a fresh air input pipe extending from outside the building to the fresh air input port;
    an exhaust air output piped extending from the exhaust air output port to outside the building;
    a first set of return air ductwork connected between the first set of rooms and the exhaust air inlet port for returning exhaust air from the first set of rooms to the ERV core;
    a second set of return air ductwork connected between the second set of rooms and the return air input port for returning return air from the second set of rooms to the ERV core; and
    a first set of supply air ducts connected to the supply air output port for providing the mixture of fresh air and supply air to the first and second sets of rooms.

12. The ERV according to claim 1, wherein the first set of rooms comprises one or more rooms selected from the group consisting of bathrooms and kitchens.

13. The ERV according to claim 12, wherein the second set of rooms comprises one or more rooms selected from the group consisting of bedrooms, family rooms, living rooms and offices.

* * * * *